United States Patent [19]
Abo

[11] Patent Number: 5,167,269
[45] Date of Patent: Dec. 1, 1992

[54] ROLLER MECHANISM FOR ROLLER BLINDS

[75] Inventor: Seiya Abo, Ichikawa, Japan

[73] Assignee: Tachikawa Corporation, Tokyo, Japan

[21] Appl. No.: 772,950

[22] Filed: Oct. 8, 1991

[30] Foreign Application Priority Data

Oct. 13, 1990 [JP] Japan .................. 2-274117

[51] Int. Cl.⁵ .............................. E06B 9/20
[52] U.S. Cl. ...................... 160/305; 160/321
[58] Field of Search ............... 160/305, 302, 307, 308, 160/309, 313, 317, 319, 321, 323.1

[56] References Cited

U.S. PATENT DOCUMENTS

| | | |
|---|---|---|
| 4,424,851 | 1/1984 | Kohayakawa . |
| 4,751,953 | 6/1988 | Appel et al. ............... 160/321 X |
| 4,779,662 | 10/1988 | Wilk ............................ 160/321 |
| 4,834,164 | 5/1989 | Tuhey ......................... 160/319 |
| 4,838,333 | 6/1989 | Mottura ....................... 160/305 |
| 4,865,109 | 9/1989 | Sherman . |

FOREIGN PATENT DOCUMENTS

| | | |
|---|---|---|
| 0180832 | 10/1985 | European Pat. Off. . |
| 0356403 | 7/1989 | European Pat. Off. . |
| 63106894 | 12/1986 | Japan . |
| 63171988 | 1/1987 | Japan . |
| 0238426 | 8/1925 | United Kingdom . |
| 2126637 | 3/1984 | United Kingdom ............... 160/313 |
| 2151678 | 7/1985 | United Kingdom ............... 160/313 |

*Primary Examiner*—David M. Purol
*Attorney, Agent, or Firm*—Heller, Ehrman, White & McAuliffe

[57] ABSTRACT

An improved winding apparatus for a roller blind is disclosed. The winding apparatus includes a clutch mechanism provided between the winding roller and the cord pulley for transmitting rotation of the pulley to rotation of the winding roller. The clutch mechanism is arranged to prevent the urging mechanism from rotating the winding roller when the cord is not handled. It also allows the pulley to rotate a predetermined angle in a screen lifting direction when the cord is operated to lift the screen. At this point, the urging mechanism is permitted to rotate the winding roller in the screen lifting direction. Additionally, when the pulley is rotated by the cord in a screen lowering direction the pulley is first allowed to rotate freely for a predetermined angle. Thereafter, the screen lowering motion of the cord is transmitted through said pulley to said winding roller to lower the screen.

5 Claims, 4 Drawing Sheets

ROLLER MECHANISM FOR ROLLER BLINDS

This application claims the priority of Japanese Patent Application No. 2-274117 filed on Oct. 13, 1990 which is incorporated herein by reference.

BACKGROUND OF THE INVENTION

1. Field of the Invention

This invention relates to a roller mechanism for raising and lowering the screen of a roller blind.

2. Description of the Related Art

One conventional winding apparatus for roller blinds is shown in FIG. 5. In this type of apparatus, a winding roller 52 is rotatably supported at both ends by a support bracket 51. A blind screen 55 is fixed to the winding roller 52. A pulley 53 is provided at one end of the winding roller 52, and is rotatably driven integrally with the winding roller 52 by an endless cord to lift and lower the screen 55. When the cord 54 is not operated, the screen 55 is held at a predetermined position by a device (not shown) for preventing the lowering of the screen 55 due to the dead weight thereof. Japanese Unexamined Published Utility Model No. 63-106894 discloses a screen winding apparatus substantially similar to the apparatus described above.

Conventional winding apparatuses such as the one described above require a continuous pulling action on the cord 54 in order to rotate the winding roller to lift or lower the screen. This requirement makes the lifting and lowering operations relatively completed.

SUMMARY OF THE INVENTION

In order to overcome the above disadvantage, an object of the invention is to provide a screen winding apparatus for a roller blind, in which the screen can be automatically lifted by a simply pulling the cord in a lowering direction.

To achieve the foregoing and other objects and in accordance with the purpose of the present invention, a winding apparatus is provided for use in a roller blind. The roller blind includes a support bracket and a winding roller rotatably supported by said support bracket. The winding roller has an internal bore. A screen is attached to said winding roller such that it may be wound about and unwound from the roller in accordance with rotation of said winding roller. A pulley is rotatably installed on said support bracket and has a cord looped thereabout to permit rotation of the pulley. An urging mechanism is disposed within the internal bore and is operably linked to the winding roller for urging the winding roller in a screen winding direction.

A clutch mechanism is provided between the winding roller and the pulley for transmitting rotation of the pulley to rotation of the winding roller. The clutch mechanism is arranged to prevent the urging mechanism from rotating the winding roller when the cord is not handled. The clutch mechanism also allows the pulley to rotate a predetermined angle in a screen lifting direction when the cord is operated to lift the screen. At this point, the urging mechanism is permitted to rotate the winding roller in the screen lifting direction. Additionally, when the pulley is rotated by the cord in a screen lowering direction the pulley is first allowed to rotate freely for a predetermined angle. Thereafter, the screen lowering motion of the cord is transmitted through said pulley to said winding roller to lower the screen.

BRIEF DESCRIPTION OF THE DRAWINGS

The features of the present invention that are believed to be novel are set forth with particularity in the appended claims. The invention, together with the objects and advantages thereof, may best be understood by reference to the following description of the presently preferred embodiments together with the accompanying drawings in which:

DESCRIPTION OF THE PREFERRED EMBODIMENT

Figure 1:
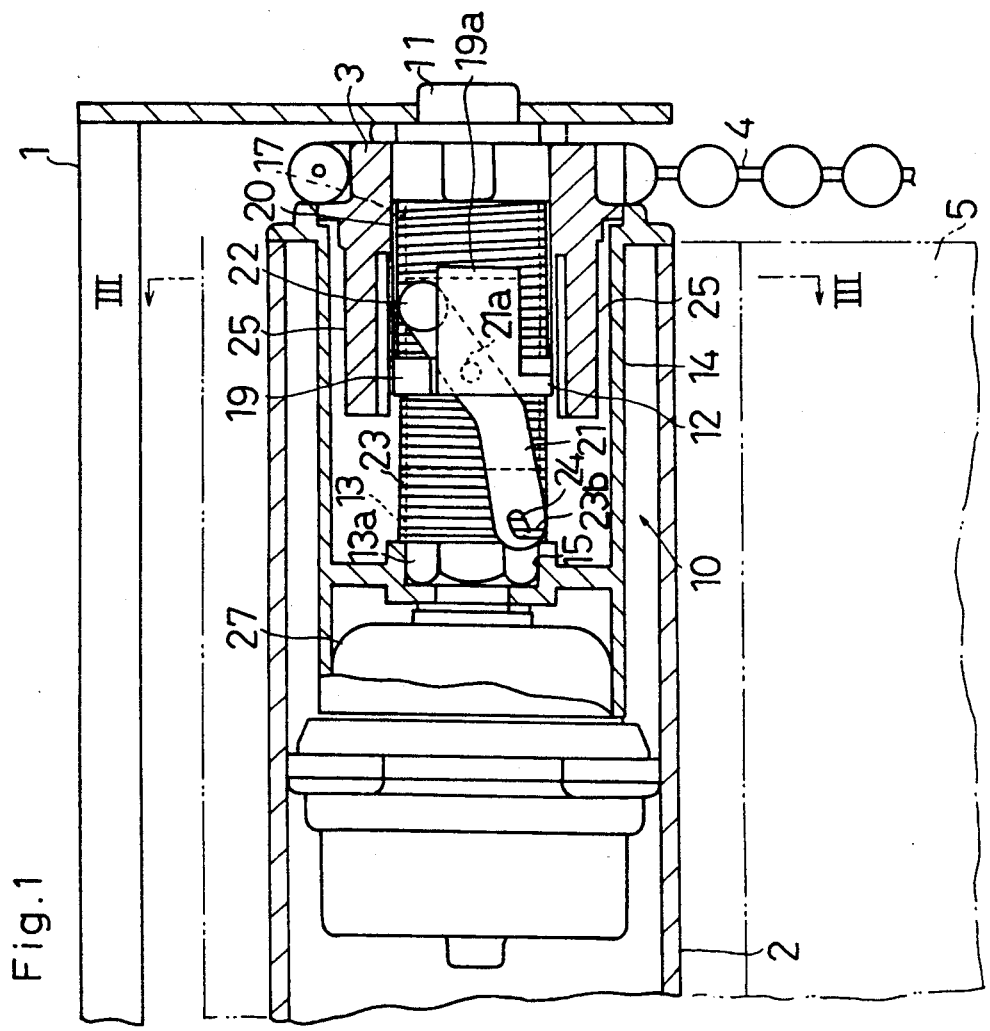
FIG. 1 is a partial cross-sectional view of a first embodiment of the winding apparatus of the present invention.
Figure 1:
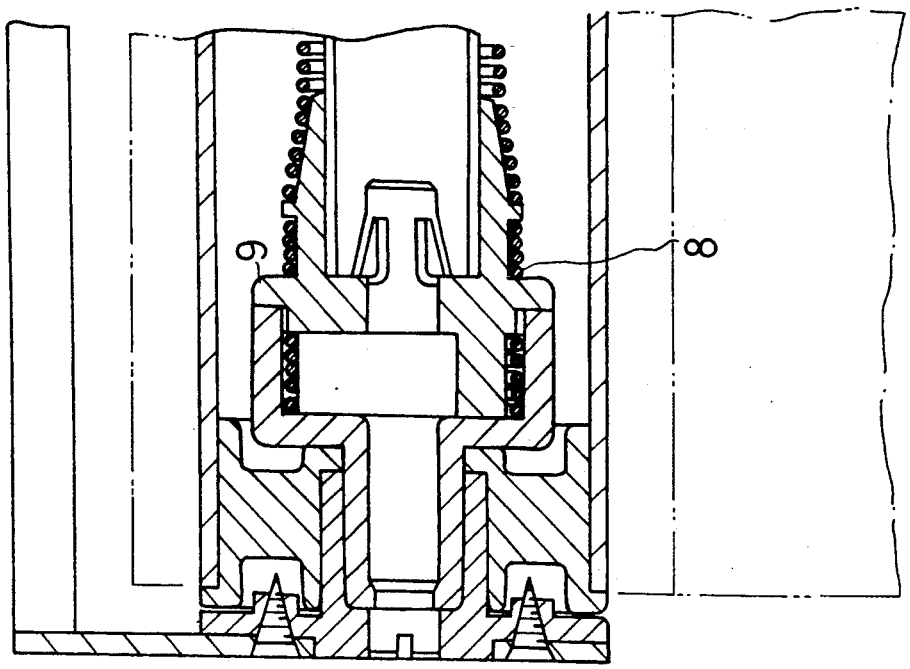
Figure 2:
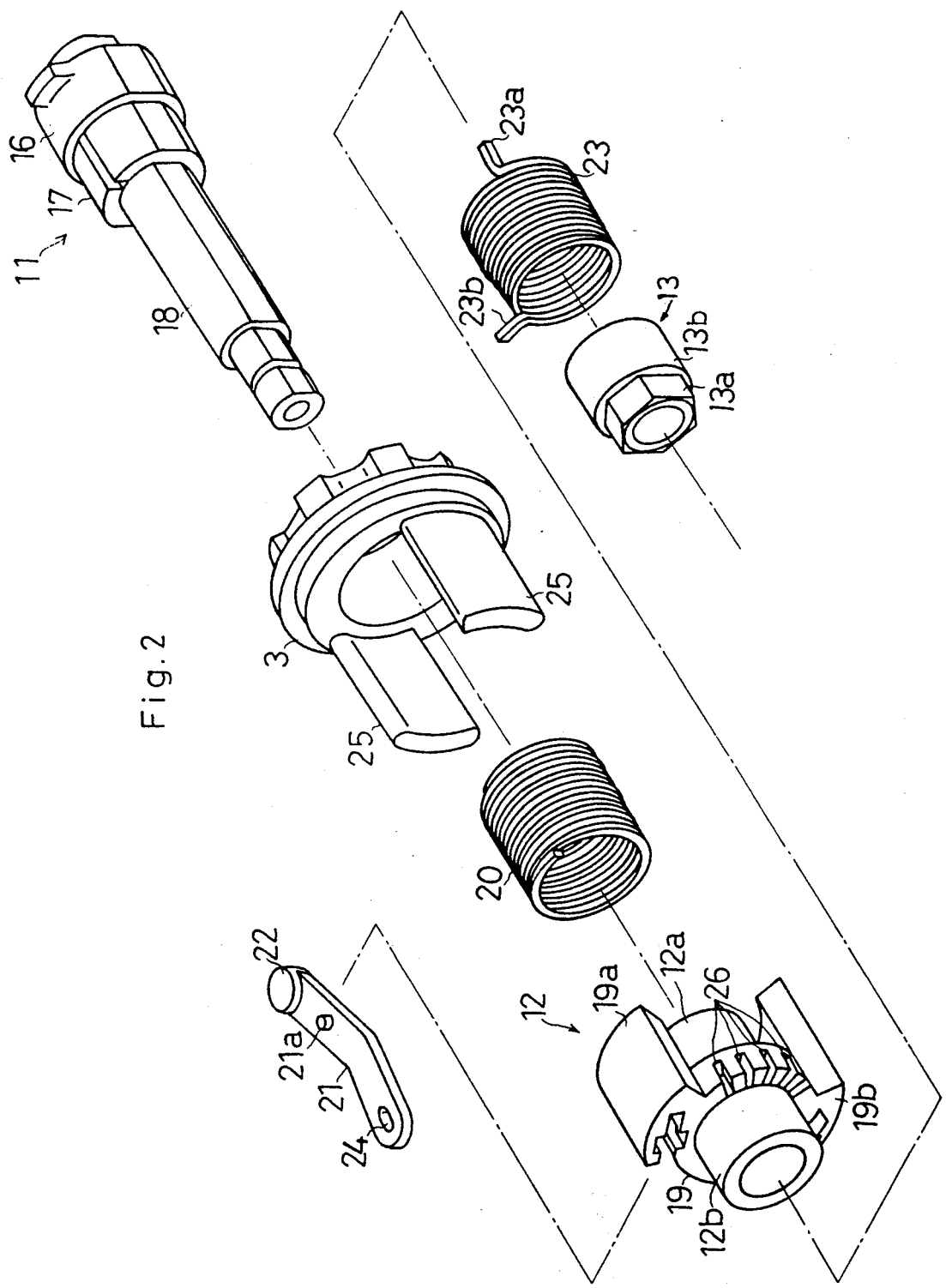
FIG. 2 is an exploded perspective view of the clutch in the winding apparatus shown in FIG. 1.

A preferred embodiment of the present invention will be described with reference to FIGS. 1 to 4. For the purpose of the described below, the "left" and "right" sides are considered the left and right sides as seen in the drawings of FIGS. 1, 2 and 4. As shown in FIG. 4, a tubular winding roller 2 is rotatably supported at both ends by a support bracket 1. In more detail, as shown in FIG. 1, a plug 9 projects from a left side portion of the bracket 1. The left end of the winding roller 2 is supported on the periphery of the plug 9. Similarly, a spring shaft 11 projects from a right side portion of the bracket 1. A pulley 3 is rotatably supported at the periphery of a base end of the spring shaft 11. The right end of the winding roller 2 is relatively rotatably supported through a clutch device 10 on the outer periphery of the pulley 3.

An endless cord 4 is looped around the pulley 3. A screen 5 is attached to the winding roller 2 such that it may be wound thereabout. The screen 5 has a weight bar 6 at its lower end and a handle 7 at the center portion of its lower end.

As shown in FIG. 1, a torsion coil spring 8 is installed in the interior space of the left end of the winding roller 2. The torsion coil spring 8 provides the torque necessary to rotate the winding roller 2 when the screen 5 is lifted. The right end (not shown) of the torsion coil spring 8 is secured to the inner surface of the center portion of the winding roller 2, while the left end thereof is secured to the tip portion of the plug 9.

Figure 3:
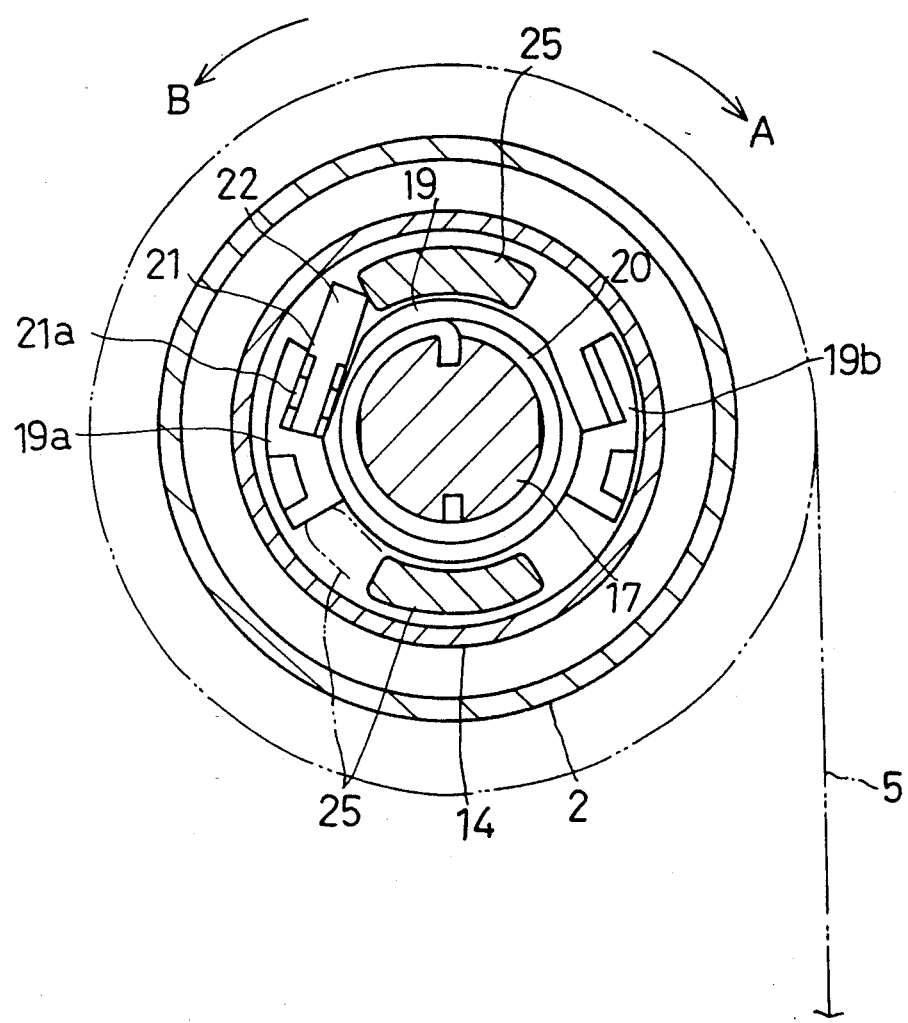
FIG. 3 is a cross-sectional view along line III—III of FIG. 1.
Figure 4:
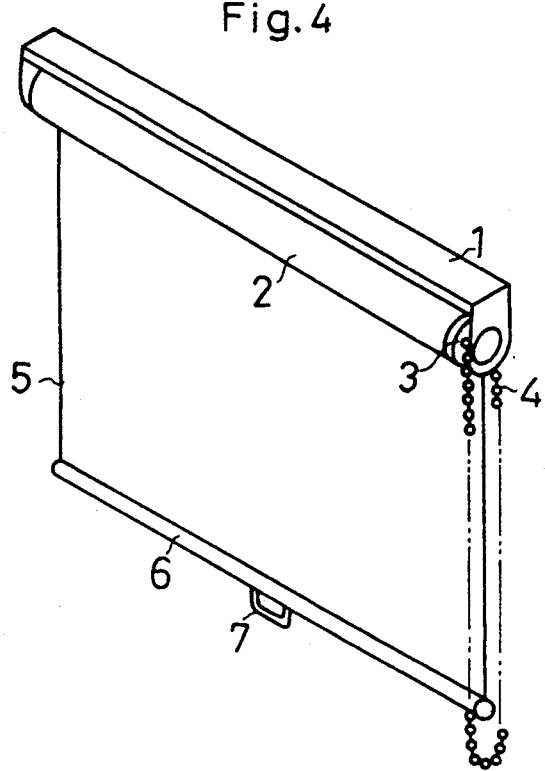
FIG. 4 is a perspective view of the entire roller blind.
Figure 5:
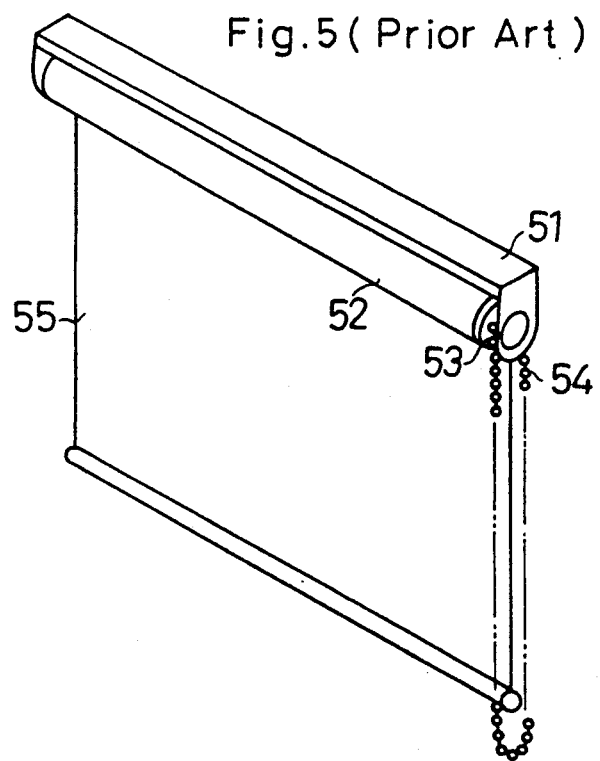
FIG. 5 is a perspective view of a conventional roller blind.

When the screen is lowered, the winding roller 2 is rotated in the direction shown by an arrow A of FIG. 3. That is, in a counterclockwise direction in the drawing. In contrast, when the screen is lifted, the winding roller 2 rotates is the direction of arrow B in FIG. 3. When the screen is lowered, an urging force accumulates within the torsion coil spring 8. Similarly, when the screen is raised the accumulated urging force is released.

The construction of the clutch device 10 will be described next. As shown in FIG. 1, a cylindrical sleeve 14 is relatively rotatably supported at the right end thereof around the outer periphery of the pulley 3. The sleeve 14 is positioned within the winding roller 2 and journaled about the spring shaft 11. The right end of the sleeve 14 is secured to the right end of the winding roller 2, while the left end of the sleeve 14 is coupled to a well-known governor 27 which frictionally engages the inner surface of the winding roller 2. The governor 27 is arranged to frictionally damp the rotary motion of the winding roller 2. A suitable governor design is set forth in Japanese Unexamined Published (Laid-Open) Patent Application No. 63-171988, which is incorporated herein by reference.

As seen in FIG. 2, the shaft 11 is divided into three stepped portions having sequentially narrower diameters from the base end to the tip end. That is, the shaft 11 includes an outer shaft portion 16, an intermediate shaft portion 16 having the largest diameter and the inner shaft portion 18 having the smallest diameter. The pulley 3, a first clutch drum 12 and a second clutch drum 13 are respectively rotatably journaled around the respective shaft portions 16, 17 and 18.

The second clutch drum 13 includes a hexagonal connecting nut 13a. The sleeve 14 includes an intermediate support wall having a hexagonal recess 15 therein that closely receives the connecting nut 13a. Thus, the clutch sleeve 14 is integrally rotatable with the second clutch drum 13 with the axis of shaft 11 being located at its rotational center.

As shown in FIG. 2, the first clutch drum 12 includes cylindrical portions 12a and 12b whose outer diameters are equal to the diameter of the intermediate shaft portion 17. A flange 19 is formed at an intermediate portion of the first clutch drum 12, and a pair of wings 19a and 19b are symmetrically formed with respect to the central axis of the clutch drum 12 in such a manner as to radially project from the flange 19.

A brake spring 20, which extends from the flange 19 to the outer shaft portion 16 of shaft 11, is journaled about the outer peripheries of the intermediate shaft portion 17 and the clutch drum's outer cylindrical portion 12a. One end of the spring 20 is anchored in the intermediate shaft portion 17.

When a torque is applied to the first clutch drum 12 to move the screen 5 in the lowering direction A, the brake spring 20 is loosened to reduce frictional forces between the brake spring 20 and the first clutch drum 12 as well as between the brake spring 20 and the intermediate shaft portion 17. Thus, the first clutch drum 12 is permitted to rotate. On the other hand, when a torque is applied to the first clutch drum 12 to move the screen in the lifting direction B, the brake spring 20 is tightly wrapped around the first clutch drum 12 and the intermediate shaft portion 17. This increases the frictional forces between the spring 20 and the first clutch drum 12 and between the spring 20 and the intermediate shaft portion 17. In this condition, rotational movement of the first clutch drum 12 is prevented.

A clutch arm 21 is pivotally supported by the wing 19a of first clutch drum 12. More specifically, a pin 21a positioned at an intermediate portion of a clutch arm 21 pivotally engages the underside of wing 19a. The clutch arm 21 has a disk-shaped engaging portion 22 at the base end thereof, and with a hole 24 at the tip portion thereof. The clutch arm 21 is secured only to the wing 19a, and is not secured to the wing 19b. The wing 19b is used only in cases where it is desirable to reverse the lifting and lowering operations of the roller blind.

The pulley 3 has a pair of legs 25 that project axially towards the center of the roller. The legs 25 are positioned between the wings 19a and 19b of the drum 12. When the pulley 3 is rotated in the screen lowering direction A, a first one of the legs 25 comes into contact with the wing 19a to apply a torque directed in the screen lowering direction A to the first clutch drum 12. On the other hand, when the pulley 3 is rotated in the screen lifting direction B, the second one of the legs 25 pushes the engaging portion 22 of the clutch arm 21 to allow the clutch arm 21 to swing in a clockwise direction as seen in FIG. 1.

The second clutch drum 13 includes a cylindrical portion 13b having the same outer diameter as the cylindrical portions 12a and 12b. A clutch spring 23, which extends from the flange 19 of the first clutch drum 12 to the intermediate wall of the clutch sleeve 14, is journaled about the outer peripheries of the cylindrical portion 12a of the clutch drum 12 and the cylindrical portion 13b of the clutch drum 13.

The flange 19 has a plurality of notches 26 formed about its periphery. A first end 23a of the clutch spring 23 is secured to one of the notches 26, while the second end 23b of the clutch spring 23 is secured to the hole 24 in the clutch arm 21. When the first clutch drum 12 is rotated in the screen lowering direction A by the pulley 3, the clutch spring 23 is tightly wound around the first and second clutch drums 12 and 13 to increase the frictional forces between the spring 23 and the first clutch drum 12 and between the spring 23 and the second clutch drum 13. In this condition, the first and second clutch drums 12 and 13 are rotated together. On the other hand, when the pulley 3 is rotated in the screen lifting direction B, the clutch arm 21 is swung clockwise as shown in FIG. 1 and the clutch spring 23 is loosened to reduce the frictional forces between the spring 23 and the second clutch drum 13. In this condition the second clutch drum 13 is permitted to rotate free in the internal bore formed by the coil spring 23.

The lifting and lowering operations of the roller blind constructed as set forth above will be described next. When the screen 5 of the roller blind is to be lowered, the pulley 3 is rotated in the screen lowering direction A by hand operating the cord 4. As the pulley 3 rotates over a predetermined angle, the leg 25 which is located at the lower position is rotated clockwise as shown by a chain line of FIG. 3, and comes into contact with the wing 19a of the first clutch drum 12, thereby supplying the first clutch drum 12 with the torque directed in the clockwise direction.

The rotation of the first clutch drum 12 in the clockwise direction causes the brake spring 20 to be loosened, and the friction force between the first clutch drum 12 and the brake spring 20 is reduced. On the other hand, the clutch spring 23 remains tightly-coiled or wound around the first and second clutch drums 12 and 13. Accordingly, the torque of the first clutch drum 12 is transmitted through the clutch spring 23, the second clutch drum 13 and the clutch sleeve 14 to the winding roller 2, so that the winding roller 2 is rotated in the screen lowering direction A and the screen is lowered. In addition, the torque is also accumulated as an urging force in the torsion coil spring 8.

When the user releases the cord 4 after the screen 5 has been lowered to a selected position, the winding roller 2 is rotatively urged in the screen lifting direction B by the urging force accumulated in the torsion coil spring 8. The torque of the winding roller 2 due to the urging force of the torsion coil spring 8 is transmitted through the clutch sleeve 14 to the second clutch drum 13. As a result, the clutch spring 23 is more tightly wound around the first and second clutch drums 12 and 13, and thus the frictional forces between the spring 23 and the first clutch drum 12 and between the spring 23 and the second clutch drum 13 are increased. The increase of the frictional force enables the torque supplied to the second clutch drum 13 to be transmitted to the first clutch drum 12.

The torque supplied to the first clutch drum 12 serves to strengthen a tightly-wound action of the brake spring 20, thereby increasing the frictional forces between the brake spring 20 and the first clutch drum 12 and between the brake spring 20 and the shaft 11, so that the rotation of the first clutch drum 19 is stopped. Therefore, undesired continuous rotation of the winding roller 2 is prevented, and the screen 5 remains stable at the selected position.

When the screen 5 is lifted, the pulley 3 is slightly rotated in the opposite direction by operation of the cord 4. That is, in the screen lifting direction B as shown in FIG. 3. The rotation of the pulley 3, rotates the leg 25 located at the upper position as shown in FIG. 3 counterclockwise and pushes the engaging portion 22 of the clutch arm 21, so that the clutch arm 21 is swung in a clockwise direction as shown in FIG. 1. This loosens the clutch spring 23 which causes the frictional force between the clutch spring 23 and the second clutch drum 13 to be reduced. Thus, power transmission between the first and second clutch drums 12, 13 are cut off. That is, the second clutch drum 13 is freely rotatable relatively to the clutch spring 23.

Consequently, the winding roller 2 is rotated in the screen lifting direction B by the urging force of the torsion coil spring 8 and the screen 5 is lifted. Continuous rotation of the winding roller 2 and thus continuous lifting of the screen 5 can be carried out by continuing to pull the cord 4 in the screen lifting direction B to keep the clutch spring 23 loose. In this case, the rotational speed of the winding roller 2 is kept below a predetermined speed by the action of the governor 27. When the screen 5 is lifted to a predetermined position, the cord 4 is released and the clutch spring 23 is tightly wound around the second clutch drum 23, so that the clutch arm 21 is returned to an initial position. Simultaneously the lifting operation of the screen 5 is stopped.

In a case where the screen 5 is lowered by the handle 7 of the weight bar 6, the torque acting on the winding roller 2 through the screen 5 is transmitted through the clutch sleeve 14 to the second clutch drum 13, and serves to reduce the frictional force between the second clutch drum 13 and the clutch spring 23. Therefore, the screen may be lowered by using the handle 7. In this case, the rotation of the winding roller 2 is not transmitted to the pulley 3.

As described above, when the cord is pulled slightly in the direction opposite to that required to lower the screen, the winding roller 2 is easily rotated to lift the screen to the predetermined position. In addition, the screen lowering operation can be carried out by the operation of the cord or handle 7. Accordingly, the lifting and lowering operation of the screen 5 according to this invention is very simple.

What is claimed is:

1. In a winding apparatus in combination with a roller blind including a support bracket, a winding roller rotatably supported by said support bracket, a screen attached to said winding roller such that it may be wound about and unwound from the roller in accordance with rotation of said winding roller, a pulley rotatably installed on said support bracket, a cord looped around said pulley for rotating said pulley, and urging means operably linked to said winding roller for urging said winding roller in a screen winding direction, the improvement wherein:

said winding roller has an internal bore and said urging means is disposed within said internal bore of the winding roller; and a clutch means is provided between said winding roller and said pulley for transmiting rotation of said pulley to said winding roller, said clutch means comprising:

a shaft that carries said pulley, said shaft being supported by said support bracket;

a sleeve which is relatively rotatably supported on said pulley and rotatable integrally with said winding roller;

a clutch drum rotatably supported around said shaft within said sleeve;

a brake spring, journaled about said clutch drum and a first portion of the shaft, for allowing rotation of said clutch drum in the screen lowering direction when the pulley is rotated in the screen lowering direction, and for preventing rotation of the clutch drum when the pulley is rotated in the screen lifting direction; and a clutch spring provided between said clutch drum and a second portion of said shaft for allowing power transmission between said clutch drum and said sleeve when the pulley is rotated in the screen lowering direction, and cutting off the power transmission between said clutch drum and said sleeve when the pulley is rotated in the screen lifting direction;

wherein said clutch means prevents rotation of said winding roller by said urging means when the core is not handled, allows the pulley to rotate by a predetermined angle in a screen lifting direction when the cord is operated to lift the screen, permitting said urging means to rotate the winding roller in the screen lifting direction after the pulley has been rotated by said predetermined angle, and allows the pulley to freely rotate by a predetermined angle in a screen lowering direction when the cord is operated to lower the screen and thereafter transmitting the screen lowering motion of the cord through said pulley to said winding roller to lower the screen.

2. The winding apparatus as claimed in claim 1, further comprising a second drum disposed on said shaft rear said clutch drum, the second drum being rotatable integrally with said sleeve, and wherein said clutch spring extends between said second drum and said clutch drum and is journaled about the outer peripheries of said second drum and said clutch drum.

3. The winding apparatus as claimed in claim 1, wherein said clutch means further includes:

at least one pair of legs projecting from said pulley;

at least one projection provided on an outer periphery of said clutch drum and engageable with said legs in accordance with rotation of said pulley; and a clutch lever rotatably supported by said projection and having a first end portion linked with said clutch spring and a second end portion engageable with said legs, and wherein when the cord is not handled, the first end portion of said clutch lever acts on said clutch spring to permit power transmission between said clutch drum and said sleeve, when the pulley is rotated in the screen lowering direction the rotation of said pulley is transmitted through said clutch drum and said clutch spring to said sleeve by an engagement between said legs and said projection of said clutch drum, and when the pulley is rotated in the screen lifting direction the power transmission between said pulley and said sleeve is cut off through an engagement between said legs and said second end portion of said clutch lever and a linkage between said second end portion of said clutch lever and said clutch spring.

4. The winding apparatus as claimed in claim 3, wherein said clutch drum includes a pair of projections, one of said pair of projections selectably supporting said clutch lever according to the direction in which said cord is pulled during screen lifting and lowering operations.

5. In a winding apparatus in combination with a roller blind including a support bracket, a winding roller rotatably supported by said support bracket, a screen attached to said winding roller such that it may be wound about and unwound from the roller in accordance with rotation of said winding roller, a pulley rotatably installed on said support bracket, a cord looped around said pulley for rotating said pulley, and urging means operably linked to said winding roller for urging said winding roller in a screen winding direction, the improvement wherein that:

said winding roller has an internal bore and said urging means is disposed within said internal bore of the winding roller;

a shaft that carries said pulley, the shaft being supported by said support bracket;

a sleeve which is relatively rotatably supported on said pulley and rotatable integrally with said winding roller, a clutch drum rotatably supported around said shaft within said sleeve, a brake spring, journaled about said clutch drum and a first portion of the shaft, for allowing rotation of said clutch drum in the screen lowering direction when the pulley is rotated in the screen lowering direction, and for preventing rotation of the clutch drum when the pulley is rotated in the screen lifting direction;

a clutch spring provided between said clutch drum and a second portion of said shaft for allowing power transmission between said clutch drum and said sleeve when the pulley is rotated in the screen lowering direction, and cutting off the power transmission between said clutch drum and said sleeve when the pulley is rotated in the screen lifting direction;

at least one pair of legs projecting from said pulley;

at least one projection provided on an outer periphery of said clutch drum and engageable with said legs in accordance with rotation of said pulley; and a clutch lever rotatably supported by said projection and having a first end portion linked with said clutch spring and a second end portion engageable with said legs, and wherein when the cord is not handled, the first end portion of said clutch lever acts on said clutch spring to permit power transmission between said clutch drum and said sleeve, when the pulley in rotated in the screen lowering direction the rotation of said pulley is transmitted through said clutch drum and said clutch spring to said sleeve by an engagement between said legs and said projection of said clutch drum, and when the pulley is rotated in the screen lifting direction the power transmission between said pulley and said sleeve is cut off through an engagement between said legs and said second end portion of said clutch lever and a linkage between said second end portion of said clutch lever and said clutch spring.

* * * * *